United States Patent
Pyun (10) Patent No.: US 8,480,380 B2
(45) Date of Patent: Jul. 9, 2013

(54) WASHER PUMP HAVING WASHER FLUID HEATING FUNCTION

(75) Inventor: Hyun Joong Pyun, Namyangju-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 355 days.

(21) Appl. No.: 12/832,716

(22) Filed: Jul. 8, 2010

(65) Prior Publication Data

US 2011/0126927 A1    Jun. 2, 2011

(30) Foreign Application Priority Data

Dec. 1, 2009  (KR) .......................... 10-2009-0117679

(51) Int. Cl.
*F04D 1/00*   (2006.01)

(52) U.S. Cl.
USPC .................... 417/313; 417/423.1; 417/423.14

(58) Field of Classification Search
USPC .................... 417/207, 307, 313, 423.1, 423.6, 417/423.7, 423.8, 423.9, 423.11, 423.12, 417/423.13, 423.14, 423.15, 424.1, 424.2; 415/175, 176, 185–187, 208.2, 208.3, 208.5
See application file for complete search history.

(56) References Cited

U.S. PATENT DOCUMENTS

| 3,833,316 | A | * | 9/1974 | Kemper | ........................ 417/307 |
| 5,094,593 | A | * | 3/1992 | Laing | ............................ 417/313 |
| 6,015,276 | A | * | 1/2000 | Ponziani | .................. 417/423.14 |

* cited by examiner

*Primary Examiner* — Charles Freay
*Assistant Examiner* — Philip Stimpert
(74) *Attorney, Agent, or Firm* — Morgan, Lewis & Bockius LLP (57) ABSTRACT

A washer pump apparatus having a washer fluid heating function, may include a housing having an inlet provided at a first end thereof to permit a washer fluid to flow thereinto, and an outlet provided at a second end thereof to permit the washer fluid to flow out therefrom, a heater unit disposed in the housing on a course extending from the inlet substantially to the outlet to heat the washer fluid passing through the heater unit, and having a hollow portion therein, a path member inserted into the hollow portion, and having on an inner circumference thereof a passage through which the washer fluid passes, an impeller unit provided in the housing and supplying the washer fluid from the inlet to the outlet, a check valve provided at a portion of the outlet, and being open when a discharge pressure of the washer fluid is a preset value or more, and a control unit selectively operating the impeller unit and the heater unit.

10 Claims, 5 Drawing Sheets

WASHER PUMP HAVING WASHER FLUID HEATING FUNCTION

CROSS-REFERENCE TO RELATED APPLICATIONS

The present application claims priority to Korean Patent Application Number 10-2009-0117679 filed on Dec. 1, 2009, the entire contents of which application is incorporated herein for all purpose by this reference.

BACKGROUND OF THE INVENTION

1. Field of the Invention

The present invention relates, in general, to a washer pump having a washer fluid heating function and, more particularly, to a washer pump having a washer fluid heating function, which is constructed so that a heater unit for heating a washer fluid is installed in the washer pump for supplying the washer fluid, thus removing frost from a windshield of a vehicle.

2. Description of Related Art

Recently, the number of vehicles has rapidly increased, thus causing a lack of indoor parking lots. Thereby, there are many cases in which vehicles are parked outdoors all day long. Therefore, frost is generated on a windshield of a vehicle which is parked outdoors in winter, and obstructs a driver's field of vision so that it is impossible to drive the vehicle unless the frost is removed from the windshield.

Conventionally, in order to remove the frost from the windshield of a vehicle, a driver uses an additional frost removing tool, applies hot water to the windshield or blows warm air from the heater of the vehicle towards the windshield.

However, these passive frost-removing methods are very inconvenient, so that consumers have complaints about the inconvenient removing methods, and thereby more active measures for the removal of frost are pressing.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a washer pump having a washer fluid heating function, which sprays a hot washer fluid on a windshield of a vehicle when frost is generated on the windshield in cold winter, thus allowing the frost to be conveniently removed and to provide a washer pump having a washer fluid heating function, which allows a washer fluid to be heated by low power regardless of whether a vehicle is warmed up, and minimizes the area occupied by a device for heating the washer fluid.

In an aspect of the present invention, the washer pump apparatus having a washer fluid heating function, may include a housing having an inlet provided at a first end thereof to permit a washer fluid to flow thereinto, and an outlet provided at a second end thereof to permit the washer fluid to flow out therefrom, a heater unit disposed in the housing on a course extending from the inlet substantially to the outlet to heat the washer fluid passing through the heater unit, and having a hollow portion therein, a path member inserted into the hollow portion, and having on an inner circumference thereof a passage through which the washer fluid passes, an impeller unit provided in the housing and supplying the washer fluid from the inlet to the outlet, a check valve provided at a portion of the outlet, and being open when a discharge pressure of the washer fluid is a preset value or more, and a control unit selectively operating the impeller unit and the heater unit.

A heating area increasing portion is formed on the inner circumference of the path member, wherein the heating area increasing portion is formed in a helical shape.

The impeller unit may include a vortex generating portion which is disposed in the passage of the path member such that the vortex generating portion does not interfere with the heating area increasing portion, and generates a vortex of the washer fluid, wherein the vortex generating portion includes an emboss formed on the outer circumference thereof.

A relief pipe may connect a portion of the inlet to a portion of the outlet disposed before the check valve, and circulates to the portion of the inlet a washer fluid which does not pass through the check valve when the impeller unit rotates at a first predetermined speed, with a safety valve provided on the relief pipe, wherein the inner diameter of the relief pipe is smaller than the inner diameter of the outlet.

The heater unit may include a positive temperature coefficient (PTC) device.

The inlet may be disposed lower than the outlet to delay a flow speed of the water fluid in the passage.

The control unit may be electrically connected to a non-heating switch and a heating switch which are provided respectively, on a predetermined portion in a vehicle, to control operation of the heater unit and the impeller unit.

The control unit may operate the impeller unit at a first predetermined speed when a signal of the non-heating switch is inputted to the control unit and, when a signal of the heating switch is inputted to the control unit, the control unit operates the heating unit and the impeller unit such that the impeller unit repeats operations of the first predetermined speed or a second predetermined speed according to a set program, wherein the first predetermined speed is higher than the second predetermined speed.

When the signal of the heating switch is inputted to the control unit, the control unit may control the impeller unit to perform the second predetermined speed for a first predetermined time period and thereafter repeats operations of the first predetermined speed for a second predetermined time period and the second predetermined speed for a third predetermined time period until a stop signal is inputted to the controller by the heating switch or the non-heating switch.

The first predetermined time period may be between approximately 40 seconds and approximately 50 seconds, the second predetermined time period may be between approximately 2 seconds and approximately 4 seconds, and the third predetermined time period may be between approximately 17 seconds and approximately 23 seconds.

In another aspect of the present invention, the control unit may control the impeller and the heater unit such that, when the signal of the heating switch is inputted to the control unit, low voltage is applied for approximately 45±5 seconds to operate the impeller unit at a second predetermined speed, and thereafter high voltage is applied for approximately 3±1 seconds to operate the impeller unit at a first predetermined speed, and thereafter operations of the second predetermined speed of the impeller unit for approximately 20±3 seconds and the first predetermined speed of the impeller unit for approximately 3±1 seconds are repeated three times, and thereafter supply of power to the impeller unit and the heater unit are stopped, wherein the first predetermined speed is higher than the second predetermined speed.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the exemplary embodiment of the present invention will be described in detail with reference to the accompanying drawings.

Figure 1:
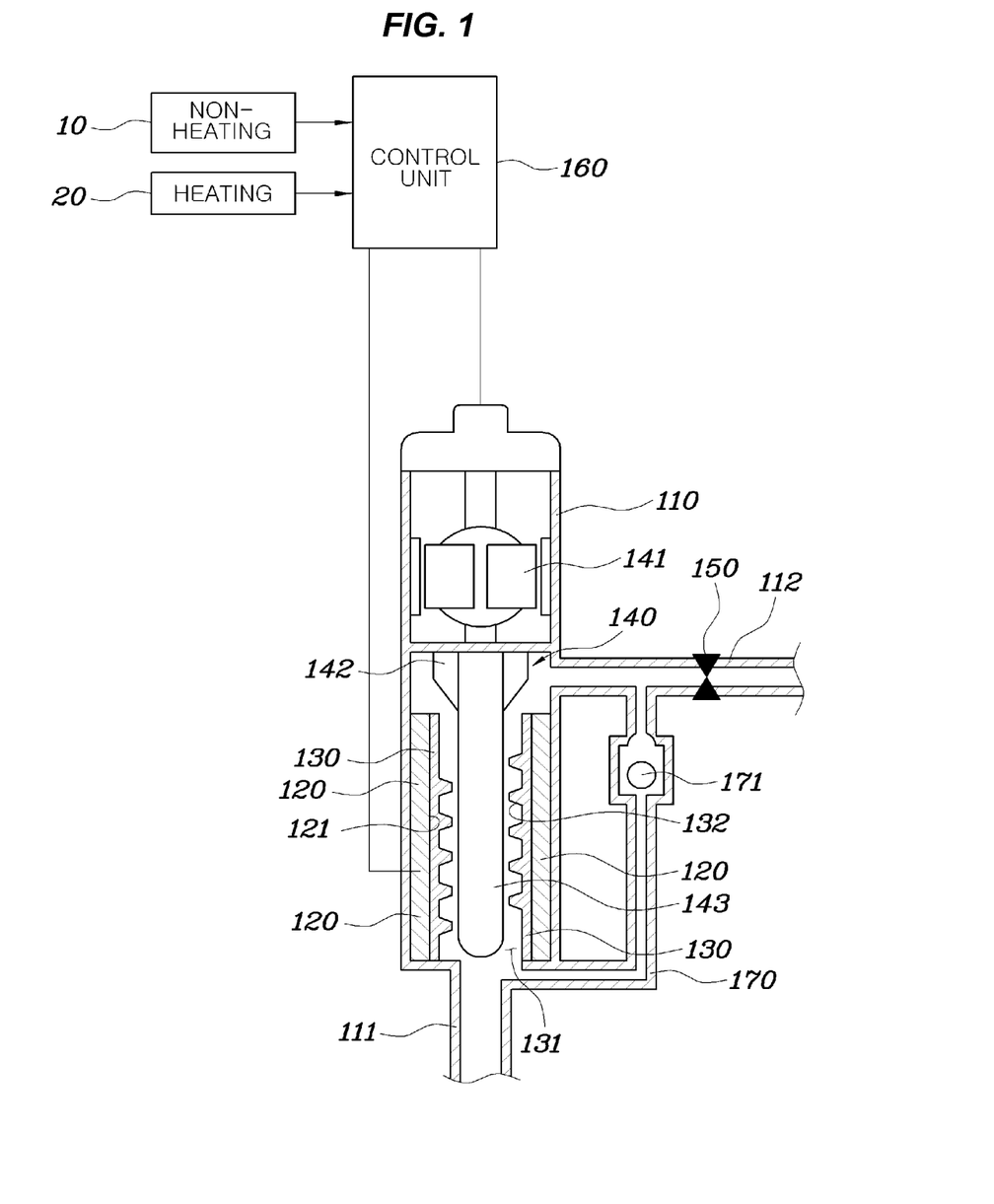
FIG. 1 is a view illustrating the construction and configuration of an exemplary washer pump according to the present invention.
Figure 2:
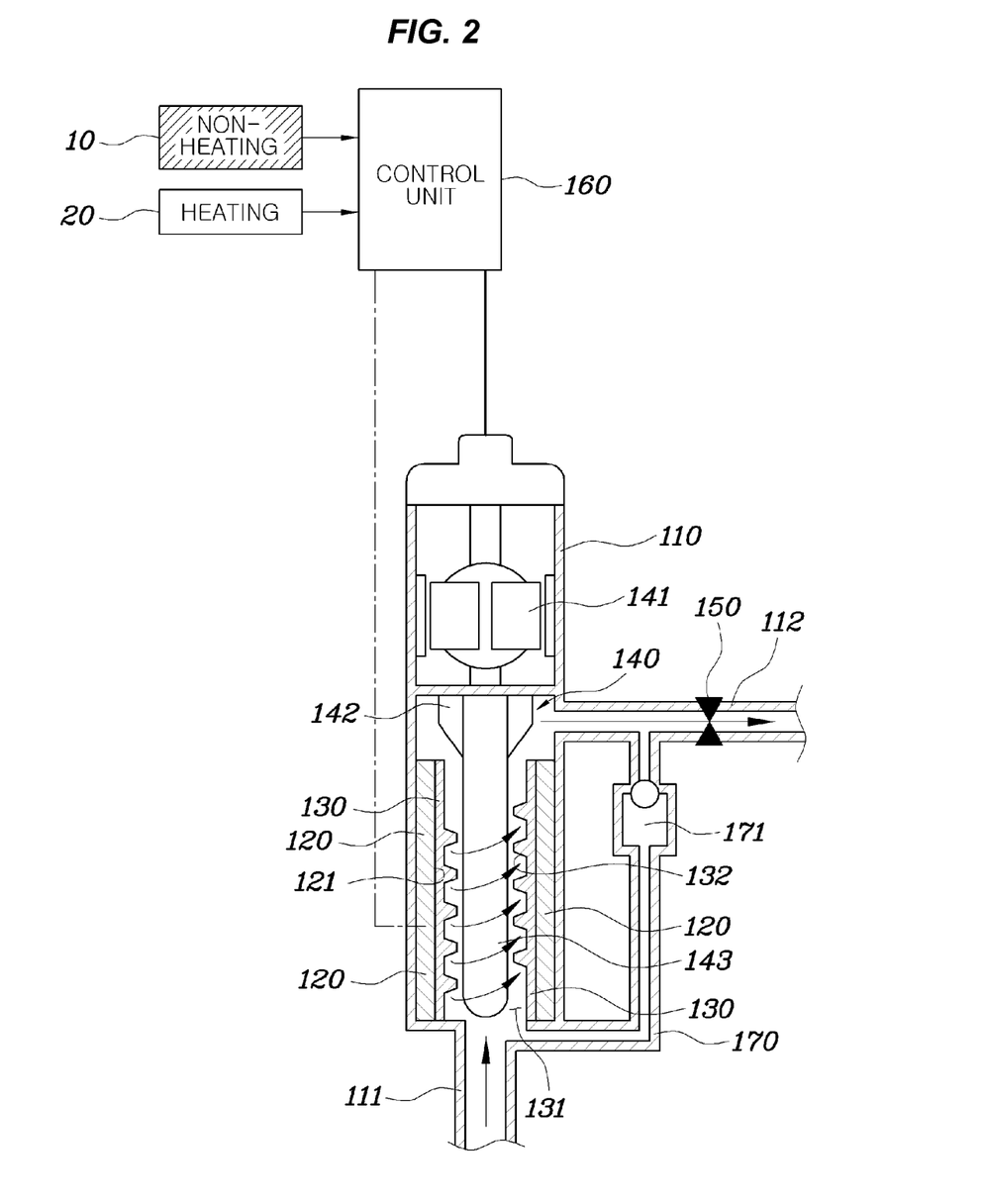
FIG. 2 is a view illustrating the exemplary spraying structure of a washer fluid which is not heated, in the present invention.
Figure 3:
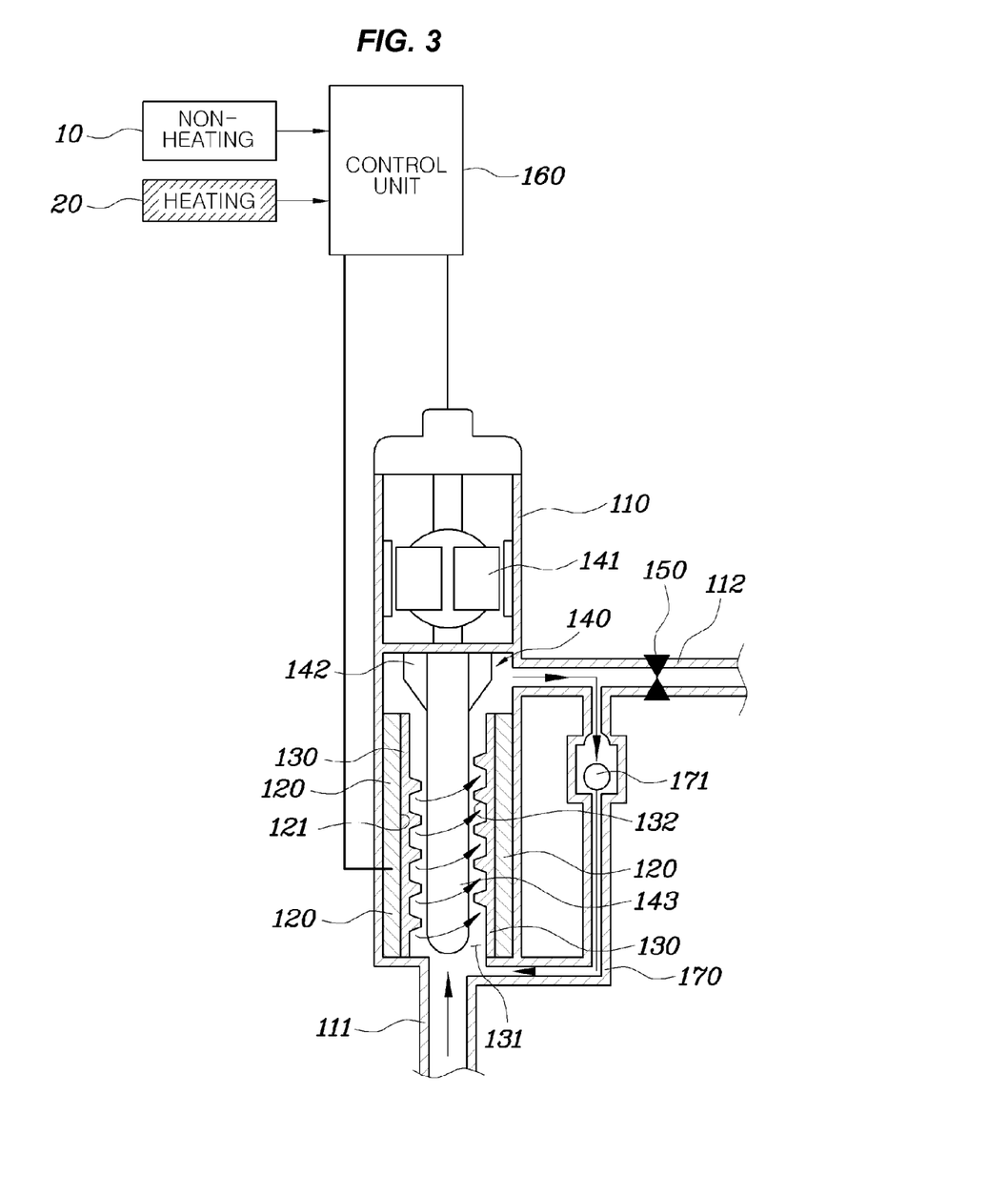
FIG. 3 is a view illustrating the exemplary circulating structure of a washer fluid which is heated, in the present invention.
Figure 4:
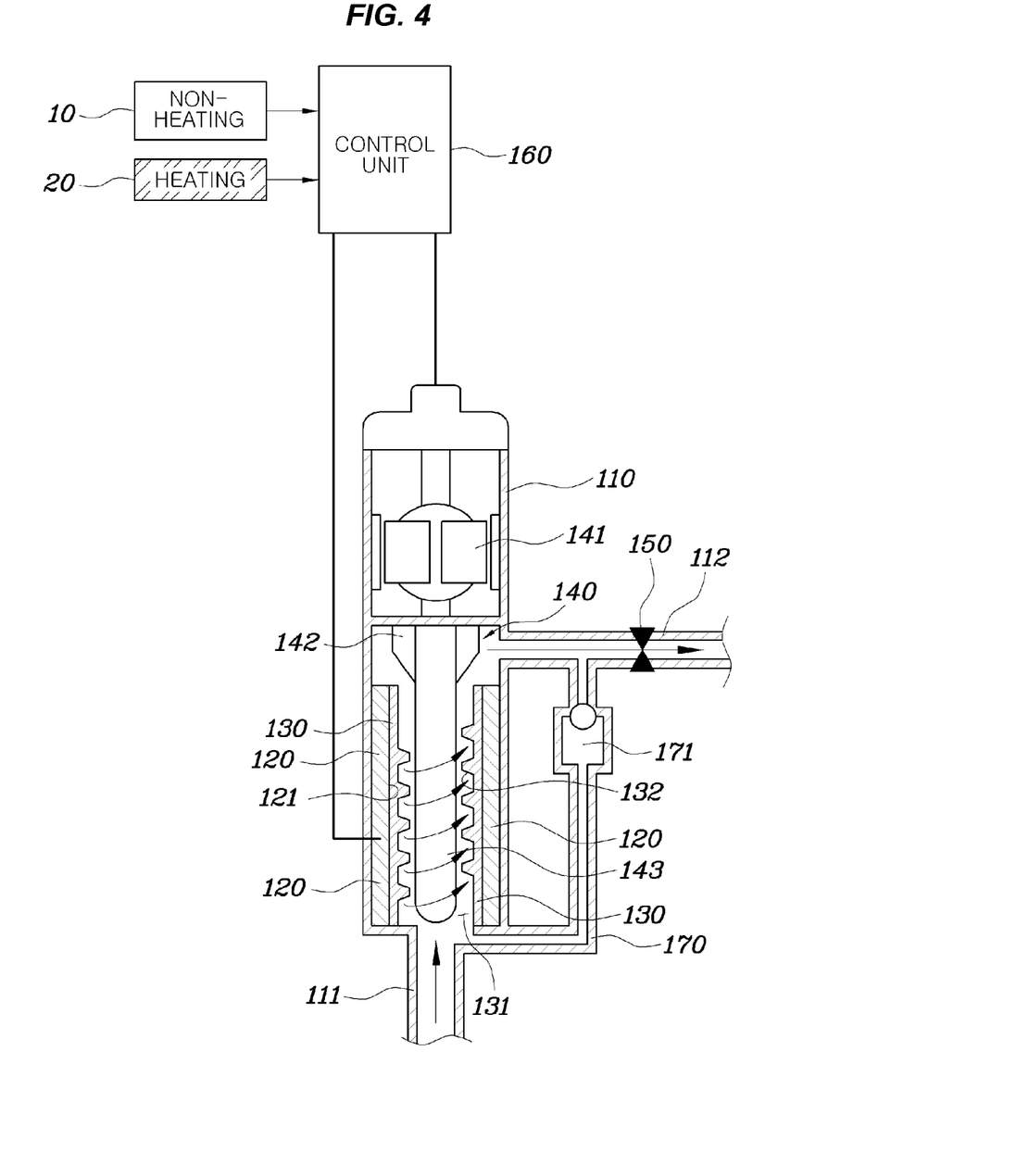
FIG. 4 is a view illustrating the exemplary spraying structure of the washer fluid which is heated, in the present invention.
Figure 5:
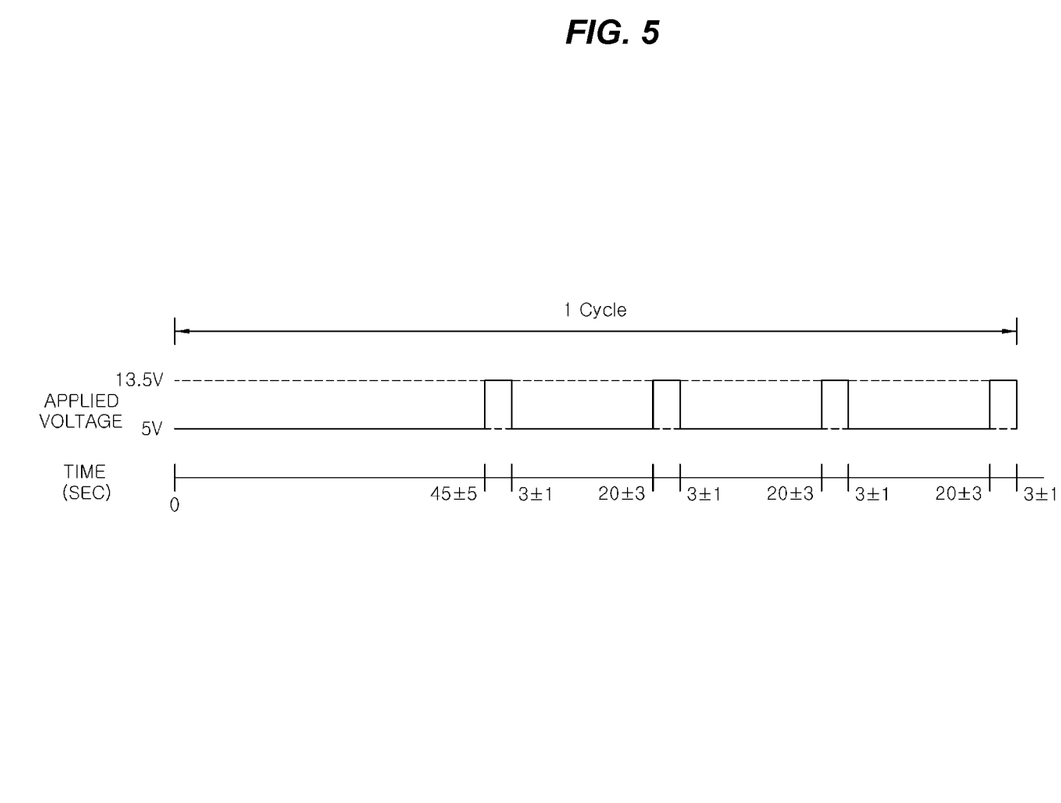
FIG. 5 is a graph illustrating the relation between time control and applied voltage which are inputted in a control unit of the present invention.

FIG. 1 is a view illustrating the construction and configuration of a washer pump according to an exemplary embodiment of the present invention, FIG. 2 is a view illustrating the spraying structure of a washer fluid which is not heated, in the present invention, FIG. 3 is a view illustrating the circulating structure of a washer fluid which is heated, in the present invention, FIG. 4 is a view illustrating the spraying structure of the washer fluid which is heated, in the present invention, and FIG. 5 is a graph illustrating the relation between time control and applied voltage which are inputted in a control unit of the present invention.

As shown in FIG. 1, the washer pump having the washer fluid heating function according to an exemplary embodiment of the present invention includes a housing 110, a heater unit 120, a path member 130, an impeller unit 140, a check valve 150, and a control unit 160.

The housing 110 defines the entire appearance of the washer pump according to an exemplary embodiment of the present invention, with a predetermined holding space being formed in the housing 110 to hold other parts therein. An inlet 111 is provided in one side of the housing 110 so that a washer fluid flows into the inlet 111, and an outlet 112 is provided in the other side of the housing 110 so that the washer fluid is discharged from the outlet 112.

The inlet 111 is connected to a washer fluid storage tank which is not shown in the drawings, so that the washer fluid flows from the washer fluid storage tank into the housing 110. The outlet 112 is connected to a washer fluid jet nozzle which is provided in a windshield of a vehicle, thus forcing the washer fluid to the washer fluid jet nozzle.

The inlet 111 and the outlet 112 are not limited to the above-mentioned positions. According to an exemplary embodiment of the present invention, as shown in the drawings, the inlet 111 is provided in the lower end of the housing 110, and the outlet 112 is provided in the outer circumference of the housing 110, so that a washer fluid fed from the lower end of the housing 110 flows up in the height direction of the housing 110, and then is discharged in any one direction of the outer circumference of the housing 110.

Meanwhile, the heater unit 120 is installed in the housing 110 and placed on a course extending from the inlet 111 to the outlet 112 in the housing 110. While the washer fluid flows from the inlet 111 to the outlet 112, the washer fluid is heated by the heater unit 120.

The outer diameter of the heater unit 120 is set so that the heater unit 120 is inserted into the housing 110. A hollow portion 121 is formed in the heater unit 120. In order to sufficiently heat the washer fluid, the heater unit 120 may have a length corresponding to a height from the inlet 111 to the outlet 112.

Here, as long as the heater unit 120 is the means that is heated by power supplied thereto, anything is possible. According to an exemplary embodiment of the present invention, an additional temperature controller is not required and a positive temperature coefficient (PTC) device which may emit a large quantity of heat with low power is adopted. However, the exemplary embodiment of the present invention is not limited to the construction, and different types of electric heating units may be used as necessary.

The heater using the PTC device will be described in brief. The PTC device is a kind of n-type oxide semiconductor which is produced by adding a very small amount of rare-earth element to $BaTiO_3$ to provide conductivity and substituting Sr or Pb for some of Ba to change the curie temperature. When the PTC device reaches a temperature, the resistance of the PTC device increases rapidly as the temperature rises because of phase transition.

Further, the path member 130 is inserted into the hollow portion 121 of the heater unit 120 to be in close contact therewith, so that heat is transferred from the heater unit 120 to the path member 130. A passage 131 is formed along the inner circumference of the path member 130 in the longitudinal direction thereof, so that the washer fluid flows along the passage 131.

Thus, the washer fluid flows from the inlet 111 through the passage 131 of the path member 130 to the outlet 112. A heating area increasing portion 132 is formed on the inner circumference of the path member 130 in the helical direction of the inner circumference. In an exemplary embodiment of the present invention, the heating area increasing portion 132 may be formed in a helical shape.

If the path member 130 has no heating area increasing portion 132, the washer fluid passing through the inlet 111 flows linearly through the passage 131 of the path member 130 and is directly discharged to the outlet 112. As such, if the washer fluid performs linear motion, the contact area of the washer fluid with the path member 130 and the moving distance of the washer fluid are reduced, so that the heating efficiency of the washer fluid may be deteriorated.

However, if the heating area increasing portion 132 is formed on the path member 130, the washer fluid introduced through the inlet 111 moves helically along the heating area increasing portion 132 and moves towards the outlet 112. Thus, a surface area contacting the path member 130 increases, and the time when the washer fluid stays in the path member 130 and the moving distance of the washer fluid increase, so that the heating efficiency of the washer fluid increases.

Meanwhile, the impeller unit 140 is installed in the housing 110 to forcibly feed the washer fluid from the inlet 111 to the outlet 112. As shown in the drawings, the impeller unit 140 includes a motor part 141 and an impeller part 142 which is coaxially coupled to the motor part 141 to be integrated therewith.

When power is supplied to the impeller unit 140, the impeller unit 140 is rotated. The rotating speed of the impeller unit 140 is changed depending on the supplied voltage. That is, when low voltage is supplied to the impeller unit 140, the impeller unit 140 is rotated at low speed. Meanwhile, when high voltage is supplied to the impeller unit 140, the impeller unit 140 is rotated at high speed, so that the discharge pressure of the washer fluid is changed.

According to an exemplary embodiment of the present invention, the low voltage supplied to the impeller unit 140 is set to be 5V, and the high voltage supplied to the impeller unit 140 is set to be 13.5V. However, the above-mentioned voltage is merely an illustrative example, so that the voltage may be changed as desired.

Further, the impeller unit 140 is provided with a vortex generating portion 143 which is inserted into the passage 131 of the path member 130 so that the vortex generating portion 143 does not interfere with the a heating area increasing portion 132 of the path member 130. In an exemplary embodiment of the present invention, the vortex generating portion 143 may includes an embossed outer circumference thereof in a convex or concave way. As shown in the drawings, the vortex generating portion 143 is integrally coupled to the impeller part 142 and extends to be inserted into the passage 131 of the path member 130.

The vortex generating portion 143 is rotated in the passage 131 of the path member 130 in the same direction as the impeller part 142, thus allowing the washer fluid to more easily flow along the a heating area increasing portion 132. That is, the vortex generating portion 143 generates the vortex of the washer fluid so that the washer fluid flows along the heating area increasing portion 132.

Further, the check valve 150 is installed at a position around the outlet 112 and is open to discharge the washer fluid when the discharge pressure of the washer fluid is a preset value or more. The check valve 150 is a one-way valve which allows the washer fluid to flow only in the discharge direction. Since the check valve 150 is widely known to those skilled in the art, a detailed description will be omitted herein and is expressed merely by a symbol.

Thus, if high voltage is applied to the impeller unit 140, the impeller unit 140 is rotated at high speed. Hence, the discharge pressure of the washer fluid increases such that the check valve 150 is open. The washer fluid is discharged through the check valve 150 when the impeller unit 140 rotates at high speed.

When low voltage is applied to the impeller unit 140, so that the impeller unit 140 rotates at low speed, the discharge pressure of the washer fluid is insufficient to open the check valve 150. Thus, the washer fluid is not discharged.

Here, a portion around the inlet 111 and a portion around the outlet 112 just before the check valve 150 are connected to each other via a relief pipe 170. A safety valve 171 may be mounted on the relief pipe 170 so that the washer fluid around the outlet 112 flows only to the inlet 111.

The relief pipe 170 includes a fine pipe which has a diameter smaller than that of the outlet 112. Thus, when the washer fluid is discharged at high speed from the outlet 112 via the check valve 150, the pressure of the outlet 112 is reduced by the flow rate of the washer fluid. Thereby, negative pressure acts on the relief pipe 170, and the safety valve 171 floats up by the negative pressure, thus closing the relief pipe 170 which communicates with the outlet 112.

When the impeller unit 140 is rotated at low speed, so that the washer fluid does not pass through the check valve 150, the relief pipe 170 functions to circulate the washer fluid to the inlet 111 and reheat the washer fluid.

If the washer fluid does not pass through the check valve 150, negative pressure is not generated in the relief pipe 170. Thus, the safety valve 171 opens the relief pipe 170, so that the washer fluid circulates through the relief pipe 170 to the inlet 111.

Meanwhile, the control unit 160 is electrically connected to a non-heating switch 10 and a heating switch 20 which are provided, respectively, on a predetermined portion in the vehicle.

The non-heating switch 10 and the heating switch 20 are switches which must be manipulated by a user, and are provided, respectively, on the predetermined portion in the vehicle. Thus, in order to spray the washer fluid which is not heated and is stored at room temperature, the user must operate the non-heating switch 10. Meanwhile, when the user desires to spray a heated washer fluid, he or she must operate the heating switch 20.

As shown in FIG. 2, when a signal of the non-heating switch 10 is inputted to the control unit 160, it applies high voltage to the impeller unit 140, thus rotating the impeller unit 140 at high speed. At this time, since the heater unit 120 is not operated, the washer fluid of room temperature is not heated, passes through the path member 130 and is sprayed through the check valve 150.

The non-heating switch 10 is used to spray a washer fluid when frost is not generated, regardless of whether it is the winter season or not.

On the other hand, as shown in FIGS. 3 and 4, when a signal of the heating switch 20 is inputted to the control unit 160, it time controls the impeller unit 140 to repeat high-speed operation and low-speed operation according to a set program that is inputted to the control unit 160. By controlling the operation of the heater unit 120, the spraying of the washer fluid is stopped until the washer fluid is sufficiently heated. When the washer fluid is sufficiently heated, it is sprayed.

First, it will be described in detail with reference to FIG. 3. As shown in FIG. 3, when the signal of the heating switch 20 is inputted to the control unit 160, the control unit 160 must acquire time to sufficiently heat the washer fluid which is unheated as of yet. Thus, low voltage is applied to the impeller unit 140, so that the impeller unit 140 is rotated at low speed and the heater unit 120 is operated. Thereby, the washer fluid fed into the housing 110 through the inlet 111 starts to become heated.

At this time, the vortex generating portion 143 stirs a cold washer fluid which passes through the path member 130 so that the washer fluid is heated quickly. Since the impeller unit 140 rotates at low speed, the washer fluid does not pass through the check valve 150, and circulates through the relief pipe 170 to the inlet 111. Thereby, the washer fluid re-enters the path member 130 and is then heated.

When the heating switch 20 is first turned on, the temperature of the washer fluid is very low. Thus, time for sufficiently heating the washer fluid must be required. When the signal of the heating switch 20 is inputted to the control unit 160, as shown in FIG. 5, low voltage is first applied for about 45±5 seconds, so that the impeller unit 140 is operated at low speed, and thus time for sufficiently heating the washer fluid without spraying it is acquired.

According to the experiment, even if the washer fluid is cooled in the winter, heating the washer fluid to reach temperature sufficient to melt frost takes about 45 seconds.

Meanwhile, if the washer fluid is sufficiently heated, the control unit 160 performs control so that high voltage is applied to the impeller unit 140 for 3±1 seconds, and thus the impeller unit 140 is operated at high speed. Thereby, as shown in FIG. 4, all of the heated washer fluid is sprayed through the check valve 150. At this time, since the flow rate around the outlet 112 is very high, a very small amount of the washer fluid around the inlet 111 may not pass through the path member 130 but may flow through the relief pipe 170 to the check valve 150. However, the flow of the washer fluid through the relief pipe 170 to the check valve 150 is prevented by the safety valve 171.

Afterwards, if the user does not turn off the heating switch 20, the control unit 160 performs control so that the washer fluid is heated again. At this time, the control unit 160 performs control so that the impeller unit 140 is operated at low speed for about 20±3 seconds, thus heating the washer fluid, and the impeller unit 140 is operated at high speed for about 3±1 seconds, thus spraying all of the heated washer fluid.

Here, unlike when the washer fluid is heated first, the control unit 160 performs control so that the heater unit 120 is operated for only about 20±3 seconds. The reason is because the heater unit 120 and the path member 130 are sufficiently heated by the operation of the heater unit 120 in the previous stage, so that a washer fluid newly entering the washer pump can be heated at sufficient temperature even if heating time is reduced.

If a user does not continuously turn off the heating switch 20, the control unit 160 performs control so that the impeller unit 140 is operated at low speed for about 20±3 seconds and then is operated at high speed for 3±1 seconds. The operations are repeated three times. Thereafter, even if the user does not turn off the heating switch 20, the supply of power to the impeller unit 140 and the heater unit 120 is compulsorily ceased, thus preventing the overload of the system. In this state, in order to spray the heated washer fluid again, the user must turn on the heating switch 20 again.

Of course, even if the control unit 160 is performing control as described above, the heating or spraying of the washer fluid is stopped if the user turns off the heating switch 20.

As described above, the present invention provides a washer pump having a washer fluid heating function, which sprays a hot washer fluid on a windshield when frost is generated on the windshield of a vehicle in winter, thus allowing the frost to be conveniently and cleanly removed.

Further, the present invention provides a washer pump having a washer fluid heating function, in which a heater unit for heating a washer fluid is installed in the washer pump, so that an area occupied by the heater unit is minimized, performance of heating the washer fluid is improved, and especially, a PTC device operated with low power is used, thus preventing the lack of power during the heating of the washer fluid.

For convenience in explanation and accurate definition in the appended claims, the terms "lower", "outer" and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A washer pump apparatus having a washer fluid heating function, comprising:
    a housing having an inlet provided at a first end thereof to permit a washer fluid to flow thereinto, and an outlet provided at a second end thereof to permit the washer fluid to flow out therefrom;
    a heater unit disposed in the housing on a course extending from the inlet substantially to the outlet to heat the washer fluid passing through the heater unit, and having a hollow portion therein;
    a path member inserted into the hollow portion, and having on an inner circumference thereof a passage through which the washer fluid passes;
    wherein a heating area increasing portion is formed in a helical shape on the inner circumference of the path member, and
    an impeller unit provided in the housing and supplying the washer fluid from the inlet to the outlet;
    a check valve provided at a portion of the outlet, and being open when a discharge pressure of the washer fluid is a preset value or more; and
    a control unit selectively operating the impeller unit and the heater unit;
    wherein the impeller unit comprises a vortex generating portion which is disposed in the passage of the path member such that the vortex generating portion does not interfere with the heating area increasing portion, and generates a vortex of the washer fluid.

2. The washer pump apparatus as set forth in claim 1, wherein a relief pipe connects a portion of the inlet to a portion of the outlet disposed before the check valve, and circulates to the portion of the inlet a washer fluid which does not pass through the check valve when the impeller unit rotates at a first predetermined speed, with a safety valve provided on the relief pipe.

3. The washer pump apparatus as set forth in claim 2, wherein the inner diameter of the relief pipe is smaller than the inner diameter of the outlet.

4. The washer pump apparatus as set forth in claim 1, wherein the heater unit comprises a positive temperature coefficient (PTC) device.

5. The washer pump apparatus as set forth in claim 1, wherein the inlet is disposed lower than the outlet to delay a flow speed of the washer fluid the passage.

6. The washer pump apparatus as set forth in claim 1, wherein the control unit is electrically connected to a non-heating switch and a heating switch which are provided respectively, on a predetermined portion in a vehicle, to control operation of the heater unit and the impeller unit.

7. The washer pump apparatus as set forth in claim 6, wherein the control unit operates the impeller unit at a first predetermined speed when a signal of the non-heating switch is inputted to the control unit and, when a signal of the heating switch is inputted to the control unit, the control unit operates the heating unit and the impeller unit such that the impeller unit repeats operations of the first predetermined speed or a second predetermined speed according to a set program, wherein the first predetermined speed is higher than the second predetermined speed.

8. The washer pump apparatus as set forth in claim 7, wherein when the signal of the heating switch is inputted to the control unit, the control unit controls the impeller unit to perform the second predetermined speed for a first predetermined time period and thereafter repeats operations of the first predetermined speed for a second predetermined time period and the second predetermined speed for a third predetermined time period until a stop signal is inputted to the controller by the heating switch or the non-heating switch.

9. The washer pump apparatus as set forth in claim 8, wherein the first predetermined time period is between approximately 40 seconds and approximately 50 seconds, the second predetermined time period is between approximately 2 seconds and approximately 4 seconds, and the third predetermined time period is between approximately 17 seconds and approximately 23 seconds.

10. The washer pump apparatus as set forth in claim 4, wherein the control unit controls the impeller and the heater unit such that, when the signal of the heating switch is inputted to the control unit, low voltage is applied for approximately 45±5 seconds to operate the impeller unit at a second predetermined speed, and thereafter high voltage is applied for approximately 3±1 seconds to operate the impeller unit at a first predetermined speed, and thereafter operations of the second predetermined speed of the impeller unit for approximately 20±3 seconds and the first predetermined speed of the impeller unit for approximately 3±1 seconds are repeated three times, and thereafter supply of power to the impeller unit and the heater unit are stopped, wherein the first predetermined speed is higher than the second predetermined speed.

* * * * *